United States Patent [19]

Ishizuka et al.

[11] Patent Number: 5,265,372

[45] Date of Patent: Nov. 30, 1993

[54] METHOD OF TURF ESTABLISHMENT AND COMPOSITIONS COMPRISING TURFGRASS AND SOIL

[75] Inventors: Makoto Ishizuka; Michihiro Sato, both of Iwaki, Japan

[73] Assignee: Kureha Kagaku Kogyo K.K., Tokyo, Japan

[21] Appl. No.: 677,732

[22] Filed: Apr. 2, 1991

[51] Int. Cl.⁵ .............................................. A01G 7/00
[52] U.S. Cl. .......................................... 47/9; 111/901
[58] Field of Search ......................... 47/9, 9 S, 9 P; 111/900, 901

[56] References Cited

U.S. PATENT DOCUMENTS 4,934,094  6/1990  Walton ........................... 47/95

FOREIGN PATENT DOCUMENTS 117721   5/1989  Japan .
3-39003  2/1991  Japan .

Primary Examiner—Ramon S. Britts
Assistant Examiner—Joanne C. Downs
Attorney, Agent, or Firm—Lowe, Price, LeBlanc & Becker

[57] ABSTRACT

Turf can be grown by mixing an artificially-granulated soil and turfgrass seeds, sprinkling the resultant seed-soil mixture on a ground and then covering a surface of the thus-sprinkled mixture with an artificially-granulated soil of the same type as the first-mentioned artificially-granulated soil to a thickness at least equal to the average grain size of the seeds but not greater than 5 mm. The artificially-granulated soils contain 0.01–2.00 wt. % of a fertilizer as calculated in terms of effective components of the fertilizer, is pH 6–7 and has an average grain size 0.5–1.5 times the average grain size of the turfgrass seeds. To prepare the seed-soil mixture, the soil is mixed with the turfgrass seeds at a rate of 30–300 g of the soil per gram of the seeds. The seed-soil mixture may be subjected to germination-hastening treatment before being sprinkled on the ground.

2 Claims, No Drawings

METHOD OF TURF ESTABLISHMENT AND COMPOSITIONS COMPRISING TURFGRASS AND SOIL

BACKGROUND OF THE INVENTION

1) Field of the Invention

The present invention relates to method of turf or lawn (hereifafter collectively called "turf" establishment, and especially to turf-growing methods which can promote uniform germination and good growth of turf over wide areas such as golf courses, playgrounds and horse race tracks. The present invention is also concerned with compsotions of turfgrass seeds and soil suitable for these and other applications.

2) Description of the Related Art

When seeding a large area of ground to establish turf, it is difficult to obtain even distribution of the turfgrass seeds when said seeds are the sole item being distributed. It has heretofore been the practice when seeding the turfgrass seed to mix it with sand soil available at the site or the like, to seed them in the extended state and then to cover them with a covering soil of the same quality as bed soil or top soil. Further, at golf courses and the like, seeded ground surfaces are covered in some instances by cheesecloth, non-woven fabrics or the like with a view toward protecting the seeds from being washed away or otherwise disturbed by wind, rain and/or sprinkled water and also avoiding drying of the top soil layer.

In the method in which turfgrass seeds are mixed with sand or a soil available at the site and then seeded in the extended state, it is however not always easy to achieve uniform mixing of the soil with the turfgrass seeds depending on the grain size distribution and shape of the sand or soil employed as an extender. In some instances, size-dependent separation may take place between turfgrass seeds and soil so that sufficiently uniform seeding may not be carried out. Upon mixing turfgrass seeds with sand or a soil available at the site, it is necessary to apply irksome pretreatment, such as drying, sterilization and elimination of weed seeds, to the sand or soil in advance. Depending on the extender to be employed, problems may arise such that turfgrass seeds would be moved or washed away by watering or rain and also tend to die or scatter away due to drying caused by a delay in work.

On the other hand, the method in which the surface of a seeded ground is covered by cheesecloth, a nonwoven fabric or the like after the seeding also involves problems such that the post-germination control is difficult and, if dissolution and elimination of the cheesecloth, the nonwoven fabric or the like is delayed or the timing of its removal is misjudged, germinated seedlings may be damaged, resulting in poor subsequent growth.

SUMMARY OF THE INVENTION

The present inventors have carried out an extensive investigation with a view toward overcoming the above-described problems of the conventional techniques.

As a result of the investigation, the present inventors have found that a uniformly-grown turf can be easily obtained when an artificially-granulated soil having an average grain size substantially the same as the size of turfgrass seeds is used as an extender and a covering soil upon seeding the turfgrass seeds, leading to the completion of the present invention.

An object of the present invention is therefore to probide a method of turf establishment which does not require such cumbersome work as described above and permits even seeding and growth of turfgrass seeds.

Another object of the present invention is to provide a composition which comprises turfgrass seeds and a soil and is useful in the practice of the above growing method.

In one aspect of the present invention, there is thus provide a method of turf establishment. The method comprises i) mixing an artificially-granulated soil, which contains 0.01–2.00 wt. % of a fertilizer as calculated in terms of effective components of the fertilizer, is pH 6–7 and has an average grain size 0.5–1.5 times the average grain size of turfgrass seeds, with the turfgrass seeds at a rate of 30–300 g of the soil per gram of the seeds; ii) sowing the resultant seed-soil mixture on a sowing bed; and iii) covering a surface of the thus-sowing mixture with an artificially-granulated soil of the same type as the first-mentioned artificially-granulated soil to a thickness at least equal to the average grain size of the seeds but not greater than 5 mm.

In another aspect of the present invention, there is also provided a composition suitable for use in growing turf. The composition comprises a) turf grass seeds and b) an artificially-granulated soil. The artificially-granulated soil contains 0.01–2.00 wt. % of a fertilizer as calculated in terms of effective components of the fertilizer, is pH 6–7 and has an average grain size 0.5–1.5 times the average grain size of the turfgrass seeds. The quantity ratio of said soil to said seeds is such that 30–300 g of the soil are contained per gram of the seeds.

Incidentally, the grain sizes of artificially-granulated soils and turfgrass seeds are each indicated by the average of the long diameters and short diameters of the corresponding soil grains or seeds.

The turf establishment method of the present invention, which features the use of an artificially-granulated soil having an average grain size 0.5–1.5 times the average grain size of turfgrass seeds as a seed extender and a covering soil, facilitates uniform sowing of the seeds to the surface of the ground, promotes uniform germination after the seeding, ensures subsequent good growth of the turfgrass, and substantially inhibits the growth of weeds. Potential washing-away, scattering-around and death of the turfgrass seeds are minimized, so that the need for irksome repair work such as oversowing can be reduced and a turf of good quality can be obtained earlier than the conventional methods. The turf establishment method of the present invention can therefore be effectively applied especially where damage to turf and a delay in the schedule for the completion of turf reflects directly on economic return, e.g., golf courses, playgrounds and horse race tracks.

DETAILED DESCRIPTION OF THE INVENTION AND PREFERRED EMBODIMENTS

The present invention will hereinafter be described in detail.

The artificially-granulated soil which is useful as an extender and also as a covering soil in the present invention can be produced by adding a desired fertilizer to a soil and then granulating the thus-fertilized soil.

Conventional soil and fertilizer can be used as the above soil and fertilizer. The fertilizer added to the soil serves to promote uniform germination after seeding and subsequent good growth. In the present invention, the fertilizer is added in such a proportion that the artificially-granulated soil may contain the fertilizer in an amount of 0.01-2.00 wt. % as calculated in terms of effective components of the fertilizer.

The inclusion of the fertilizer in the above range in the artificially-granulated soil makes it possible to obviate application of a fertilizer during an initial stage of growth of the turfgrass, namely, for about 1-2 months. This can also overcome the potential problem of fertilizer troubles. If the fertilizer is too strong, i.e., its concentration is beyond the upper limit there is a potential danger of problems such as spindly growth or death of the turfgrass. If the strength of the fertilizer is below the lower limit, it would be difficult to achieve the desired growth.

In addition, the soil which is to be used to produce the artificially-granulated soil in the present invention should be adjusted to pH 6-7, which is a suitable pH range for the germination and growth of turfgrass seeds, before its granulation, whereby the pH of the resulting, artificially-granulated soil falls within the same range. If the pH of the artificially-granulated soil is outside the above range, for example, falls within a pH range of 4.5-5.5 like artificially-granulated soil for raising rice seedlings, phenomena undesirable for the growth of turf, such as growth problems, tend to occur.

Soil with pH and fertilizer content falling within the corresponding ranges specified above is granulated by a method commonly known in the art. Upon granulation, it is necessary to choose the average grain size of the resulting, artificially-granulated soil in the light of the average grain size of the turfgrass seeds. There are a wide variety of turfgrasses. Seed sizes therefore vary widely, ranging from an average grain size as small as about 0.5 mm (e.g., seeds of Penncross bentgrass) to an average grain size as large as about 2 mm (e.g., seeds of Perennial ryegrass). It is therefore important to choose the average grain size of the artificially-granulated soil, which is to be employed as an extender, in accordance with the average grain size of the turfgrass seeds.

According to the results of the present inventors' investigation, it has been found that the average grain size of the artificially-granulated soil is preferably in a range 0.5-1.5 times the average grain size of the turfgrass seeds in the present invention. For use as an artificially-granulated soil in the present invention, each soil is granulated to have an average grain size in the range 0.5-1.5 times the average grain size of its corresponding turfgrass seeds. As long as the average grain size of an artificially-granulated soil falls within the above range, the artificially-granulated soil will not develop the above-mentioned size-dependent separation and other inconvenience when employed as an extender and as a covering soil after seeding. If the average grain size of the artificially-granulated soil is greater than 1.5 times the average grain size of the turfgrass seeds, the turfgrass seeds tend to be washed away or otherwise moved away by watering or rain after the seeding. If the average grain size of the artificially-granulated soil is smaller than 0.5 times, the dispersion of the turfgrass seed tends to become uneven and localized high density of seeds may be observed. Here again, it is difficult to achieve the desired effects.

In the present invention, the artificially-granulated soil produced as described above is mixed with turfgrass seeds at a rate of 30-300 g of the soil per gram of the turfgrass seeds and is then sowed. If the proportion of the artificially-granulated soil is smaller than the lower limit, it is difficult to attain the desired growing effects. Soil proportions greater than the upper limit have the potential danger that fertilizer troubles such as spindly growth or death of the turfgrass may be induced.

After the mixture of the artificially-granulated soil and the turfgrass seeds have been mixed as described above, the same artificially-granulated soil is used as a covering soil. Soil-covering is conducted to a thickness at least equal to the average grain size of the turfgrass seeds but not greater than 5 mm so that the artificially-granulated soil uniformly covers the surface of the seeded ground. When the artificially-granulated soil so employed has a smaller average grain size, it is preferable to apply the artificially-granulated soil to a thickness of 1 mm or greater. Any unduly large thickness leads to a decreased germinating vigor, so that the thickness of the covering soil should desirably be not greater than 5 mm.

When turfgrass seeds are covered to a thickness at least equal to the average grain size of the seeds and in the range of 1-5 mm by using an artificially-granulated soil having an average grain size 0.5-1.5 times the average grain size of the seeds, it is unnecessary, unlike when river sand is used as a covering soil, to cover the surface of the seeded ground by cheesecloth or a non-woven fabric which is required to protect the seeds from being washed away or otherwise scattered around.

A description has been made of the advantages available from the use of the above-described artificially-granulated soil, which has an average grain size 0.5-1.5 times the average grain size of seed grains, as an extender and also a covering soil. Certain features of the present invention, including the above-described advantages, will hereinafter be described by the following examples and comparative examples, in which germination percentages and ground cover percentages were calculated as follows:

Penncross bentgrass

Assuming that 1,570 seeds (20 seeds on average per $cm^2$) were placed on an area of 76.5 $cm^2$ collected by a hole cutter, the germination percentage and ground cover percentage were calculated in accordance with the following formulae, respectively:

Germination percentage = (Number of upright stems on the $30^{th}$ day after seedling/1570) × 100

Ground cover percentage = Percentage of area containing at least 20 upright stems per $cm^2$ on the $30^{th}$ day after seedling Perennial ryegrass Assuming that 236 seeds (3 seeds on average per $cm^2$) were placed on an area of 76.5 $cm^2$ collected by a hole cutter, the germination percentage and ground cover percentage were calculated in accordance with the following formulae, respectively:

Germination percentage = (Number of upright stems on the $30^{th}$ day after seedling/236) × 100

Ground cover percentage = Percentage of area containing at least 3 upright stems per cm² on the 30ᵗʰ day after seedling Further, the pH of each artificially-granulated soil was measured as follows:

Twenty-five milliliters of 1 N-KCl aq. solution (adjusted to pH 7.0 in advance) were added to 10 g of the artificially-granulated soil. The resultant mixture was shaken and then allowed to stand for at least 1 hour. After gently stirring the liquid mixture into a suspended state, the pH of the liquid mixture was measured by a glass-electrode pH meter.

EXAMPLE 1

To a soil whose pH had been adjusted to 6.5, a fertilizer was added to contain 0.04 wt. % of whole nitrogen, 0.10 wt. % of $PO_2O_5$ and 0.06 wt. % of $K_2O$ as effective components. The resulting soil-fertilizer mixture was granulated to give an average grain size of 0.3–0.7 mm, whereby an artificially-granulated soil (pH 6.5) was obtained. The artificially-granulated soil was then mixed with Penncross bentgrass seed (average grain size: about 0.5 mm) at a weight ratio of 40:1. The soil-seed mixture was moistened with a small amount of water and then maintained at 30° C. for 3 days, whereby the seeds were subjected to germination-hastening treatment. On the soil of a planting mount formed and improved by mounding work of pebbles and pit sand, the soil-seed mixture was thereafter sowed by a gravity seeder at a seeding rate of 10 g of Penncross bentgrass seed per m². An artificially-granulated soil of the same type as that employed above was then applied as a covering soil to a thickness of 3 mm.

As a result, even germination was observed on the 4ᵗʰ day after the seeding. The subsequent growth was also found to be good. On the 30ᵗʰ day after the seeding, sod samples were taken from desired 10 locations by a hole cutter having a diameter of 10 cm and then measured. Their average germination percentage and ground cover percentage were 96% and 92%, respectively. The turf raised in the manner described above created a strong, attractive lawn in about two months after the seeding. During that period, there was no over-sowing or the like which has heretofore been required to compensate any seeds washed away or scattered around and/or any damaged seedlings. Only usual management work was only undertaken.

COMPARATIVE EXAMPLE 1

An artificially-granulated soil—which had been granulated to have grain sizes of 2–3 mm, contained similar fertilizer components to those described in Example 1 and had pH 6.5, was mixed with Penncross bentgrass seed at a weight ratio of 40:1, whereby the seeds were extended. The soil-seed mixture thus obtained was moistened with a small amount of water and then maintained at 30° C. for 3 days, whereby the seeds were subjected to germination-hastening treatment. On the soil of a planting mount formed and improved by mounding work of pebbles and pit sand, the soil-seed mixture was thereafter sowed by a gravity seeder at a seeding rate of 10 g of Penncross bentgrass seed per m². An artificially-granulated soil of the same type as that employed above was then applied as a covering soil to a thickness of 3 mm.

Although germination was also observed on the 4ᵗʰ day after the seeding, it was uneven compared to Example 1 and localization of seeds was observed. On the 30ᵗʰ day after the seeding, sod samples were taken from desired 10 locations by a hole cutter having a diameter of 10 cm and then measured. Their average germination percentage and ground cover percentage were 87% and 84%, respectively, much smaller than their corresponding values in Example 1.

EXAMPLE 2

An artificially-granulated soil (400 kg), which had been granulated to have grain sizes of 0.3–0.7 mm, contained similar fertilizer components to those described in Example 1 and had pH 6.5—was mixed with 4.5 kg of Penncross bent grass seed. After the soil-seed mixture thus obtained was subjected to germination-hastening treatment in a similar manner to Example 1, the soil-seed mixture was evenly sowed by a gravity seeder at a seeding rate on 550 m² of a sand green which had been constructed using zeolite as a soil conditioning material. An artificially-granulated soil of the same type as that employed above was then applied as a covering soil to a thickness of 1 mm.

The seeds of Penncross bentgrass so sowed showed even germination on the 4ᵗʰ day after the seeding. Good post-germination growth was also observed. On the 30ᵗʰ day after the seeding, sod samples were taken from desired 10 locations by a hole cutter having a diameter of 10 cm and then measured. Their average germination percentage and ground cover percentage were 94% and 92%, respectively. Subsequent growth was good and substantially neither washing-away nor scattering-around of seeds was observed, so that turf of good quality was created within 2 months after the seeding.

COMPARATIVE EXAMPLE 2

River sand (400 kg) having an average grain size of 2.0–3.0 mm was mixed with 4.5 kg of Penncross bent grass seed. After the sand-seeds mixture thus obtained was subjected to germination-hastening treatment in a similar manner to Example 1, the sand-seeds mixture was evenly sowed by a gravity seeder on 550 m² of a sand green which had been constructed using zeolite as a soil conditioning material. River sand of the same type as that employed above was then applied as a covering soil to a thickness of about 3 mm.

Although germination was observed on some of the thus-sprinkled seeds of Penncross bentgrass on the 4ᵗʰ day after the seeding, overall germination took place two days later, i.e., on the 6ᵗʰ day. Further, seeding irregularity and washing-away and scattering-around of seeds were observed. Subsequent growth was uneven, so that partial repair work by over-sowing and sodding was needed three times over the period of 2 months. On the 30ᵗʰ day after the seeding, sod samples were taken from desired 10 locations by a hole cutter having a diameter of 10 cm and then measured. Their average germination percentage and turfed area percentage were 84% and 83%, respectively—much smaller than the corresponding values in Example 2.

COMPARATIVE EXAMPLE 3

An artificially-granulated soil (400 kg), which had been granulated to have grain sizes of 2.0–3.9 mm, contained similar fertilizer components to those described in Example 1 and had pH 6.5—was mixed with 4.5 kg of Penncross bentgrass seed. After the soil-seed mixture thus obtained was subjected to germination-hastening treatment in a similar manner to Example 1, the soil-seed mixture was evenly sowed by a gravity seeder on 550 m² of a sand green which had been constructed using zeolite as a soil conditioning material. The entire surface of the thus-seeded ground was then covered by a water-soluble nonwoven fabric.

Although the Penncross seeds sowed as described above exhibited germination over the entire surface approximately on the 6th day after the seeding, seeding irregularity occurred similarly to the case of Comparative Example 2 so that repair was needed. In addition, the elimination of the water-soluble nonwoven fabric employed as a substitute for a covering soil was delayed. This suppressed smooth growth of the seedlings thus germinated, resulting in a delay in the turf-completing schedule. On the 30th day after the seeding, sod samples were taken from desired 10 locations by a hole cutter having a diameter of 10 cm and then measured. Their average germination percentage and turfed area percentage were 82% and 80%, respectively, again much smaller than the corresponding values in Example 2.

EXAMPLE 3

To a soil whose pH had been adjusted to 6.5, a fertilizer was added to contain 0.04 wt. % of whole nitrogen, 0.10 wt. % of $P_2O_5$ and 0.06 wt. % of $K_2O$ as effective components. The resulting soil-fertilizer mixture was granulated to give an average grain size of 2.0–3.0 mm, whereby an artificially-granulated soil (pH 6.5) was obtained. The artificially-granulated soil was then mixed with Perennial ryegrass seeds (average grain size: about 2 mm) at a weight ratio of 40:1. The soil-seed mixture was subjected to germination-hastening treatment in a similar manner to Example 1. On the soil of a planting mount formed and improved by mounding work of pebbles and pit sand, the soil-seed mixture was thereafter sowed by a gravity seeder at a seeding rate of 50 g of Perennial ryegrass seed per m². An artificially-granulated soil of the same type as that employed above was then applied as a covering soil to a thickness of 3 mm.

As a result, even germination was observed on the 4th day after the seeding. The turf grew to about 20 mm or so at the end of the 1st week. The subsequent growth was also found to be good. On the 30th day after the seeding, sod samples were taken from desired 10 locations by a hole cutter having a diameter of 10 cm and then measured. Average germination percentage and ground cover percentage were 93% and 87% respectively, as shown in Table 1.

COMPARATIVE EXAMPLE 4

An artificially-granulated soil—which had been granulated to have grain sizes of 0.3–0.7 mm, contained similar fertilizer components to those described in Example 3 and had pH 6.5—was mixed with Perennial ryegrass seed (average grain size: about 2.0 mm) at a weight ratio of 40:1. On the soil of a planting mount formed and improved by mounding work of pebbles and pit sand, the soil-seed mixture was thereafter sowed by a gravity seeder at a seeding rate of 50 g of Perenial ryegrass seed per m². An artificially-granulated soil of the same type as that employed above was then applied as a covering soil to a thickness of 3 mm.

Although the Perennial ryegrass seed sowed as described above showed germination on the 4th day after seeding, size-dependent separation between the seeds and the artificial granulated soil took place when sowed so that seeding irregularity took place. As a result, even germination was observed on the 4th day after the seeding. The turf grew to about 20 mm or so at the end of the 1st week. On the 30th day after seeding, sod samples were taken from desired 10 locations by a hole cutter having a diameter of 10 cm and then measured. Average germination percentage and ground cover percentage were 87% and 81% respectively, again much smaller than the corresponding values in Example 3.

COMPARATIVE EXAMPLE 5

An artificially-granulated soil, which had been granulated to have grain sizes of 3.5–4.5 mm, contained similar fertilizer components to those described in Example 3 and had pH 6.5, was mixed with Perennial ryegrass seed (average grain size: about 2.0 mm) at a weight ratio of 40:1. On the soil of a planting mount formed and improved by mounding work of pebbles and pit sand, the soil-seed mixture was thereafter sowed by a gravity seeder at a seeding rate of 50 g of Perennial ryegrass seed per m². An artificially-granulated soil of the same type as that employed above was then applied as a covering soil to a thickness of 3 mm.

Although the Perennial ryegrass seed sowed as described above showed germination on the 4th day after the seeding, overall germination took place two days layer, i.e., on the 6th day. On the 30th day after the seeding, sod samples were taken from desired 10 locations by a hole cutter having a diameter of 10 cm and then measured. As shown in Table 1, their average germination percentage and ground cover percentage were 84% and 79% respectively, also much smaller than the corresponding values in Example 3 as in Comparative Example 4. The subsequent growth was uneven, resulting in a delay in the turf-completing schedule.

TABLE 1

| Items measured | Germination percentage (%) | Ground cover percentage (%) | Dry weight of aerial parts (g/hole cutter) | Dry weight of subterranean parts (g/hole cutter) |
| --- | --- | --- | --- | --- |
| Comp. Ex. 4 | 87 | 81 | 0.92 | 1.12 |
| Example 3 | 93 | 87 | 1.00 | 1.23 |
| Comp. Ex. 5 | 84 | 79 | 0.84 | 1.08 |

Compared in Table 1 are the average germination percentages and average ground cover percentage (expressed in terms of the percentage of area having at least 3 upright stems per cm²) of the sod samples taken by the 10 cm diameter hole cutter from the desired 10 locations on the 30th day after seeding in Example 3 and Comparative Examples 4 and 5 as well as the dry weights of aerial parts of the sods per hole cutter and the dry weights of subterranean parts of the sods per hole cutter. As is clearly demonstrated by the table, Example 3 according to the method of the present invention shows superiority in each of the compared items and the values of Comparative Examples 4 and 5 are much smaller than the corresponding values of Example 3.

We claim:
1. A method of turf establishment which comprises:
   i) mixing an artificially-granulated soil with turfgrass seeds at a rate of 30 to 300 g of soil per gram of turfgrass seed thereby forming a seed-soil mixture, said artificially granulated soil containing 0.01–2.00 wt. % of a fertilizer as calculated in terms of total wt. % of whose nitrogen, $P_2O_5$ and $K_2O$ of the fertilizer, having a pH of 6–7 and having an average grain size 0.5–1.5 times an average grain size of said turfgrass seeds;
   ii) sowing the seed-soil mixture on a ground; and
   iii) covering a surface of the thus-sown seed-soil mixture with an artificially-granulated soil of the same type as said artificially-granulated soil to a thickness at least equal to the average grain size of turfgrass seeds but not greater than 5 mm.
2. The method of claim 1, further comprising subjecting the seed-soil mixture to a germination-hastening treatment before the sowing of the seed-soil mixture.

* * * * *